United States Patent [19]

Kopf

[11] Patent Number: 4,956,085
[45] Date of Patent: Sep. 11, 1990

[54] FILTER PLATE, FILTER PLATE ELEMENT AND FILTER COMPRISING SAME

[76] Inventor: Henry B. Kopf, 108 Coatbridge Cir., Cary, N.C. 27511

[21] Appl. No.: 378,032

[22] Filed: Jul. 11, 1989

Related U.S. Application Data

[62] Division of Ser. No. 104,177, Oct. 2, 1987, Pat. No. 4,867,876.

[51] Int. Cl.[5] .................. B01D 25/12; B01D 13/00
[52] U.S. Cl. ......................... 210/231; 210/321.75; 210/321.84; 210/456
[58] Field of Search ................. 210/231, 228, 321.84, 210/321.75, 433.2, 346, 456

[56] References Cited

U.S. PATENT DOCUMENTS

| | | |
|---|---|---|
| 744,761 | 11/1903 | James . |
| 802,105 | 10/1905 | Johnson et al. . |
| 1,138,251 | 5/1915 | Schaefer . |
| 1,282,414 | 12/1918 | Hastrom . |
| 1,540,251 | 9/1925 | Buckley et al. . |
| 2,390,628 | 12/1945 | Van Winkle ............ 210/188 |
| 2,473,986 | 9/1949 | Booth ................... 210/185 |
| 2,590,242 | 3/1952 | Fusco .................... 210/188 |
| 3,221,883 | 12/1965 | Lennström ............... 210/220 |
| 3,520,803 | 7/1970 | Iaconelli ................. 210/23 |
| 3,585,131 | 6/1971 | Esmond .................. 210/321 |
| 3,966,612 | 6/1976 | Johansson ............... 210/238 |
| 3,988,242 | 10/1976 | Kurita et al. ............ 210/227 |
| 4,229,304 | 10/1980 | Fismer ................... 210/231 |
| 4,235,721 | 11/1980 | Nakamura et al. ......... 210/227 |
| 4,255,263 | 3/1981 | Galimi .................. 210/321.84 |
| 4,310,416 | 1/1982 | Tanaka et al. ............ 210/321.3 |
| 4,411,784 | 10/1983 | Esmond ................. 210/321.1 |
| 4,430,218 | 2/1984 | Perl et al. ............... 210/321.3 |
| 4,447,326 | 5/1984 | Riede ................... 210/321.77 |
| 4,540,492 | 9/1985 | Kessler ................. 216/651 |
| 4,543,187 | 9/1985 | Steppacher .............. 210/232 |
| 4,624,784 | 11/1986 | Lefebvre ................ 210/321.1 |
| 4,735,718 | 5/1988 | Peters .................. 210/321.1 |
| 4,750,983 | 6/1988 | Foster et al. ............ 204/301 |
| 4,769,140 | 9/1988 | Van Dijk et al. .......... 210/184 |

FOREIGN PATENT DOCUMENTS 1392030 4/1975 United Kingdom .

OTHER PUBLICATIONS

Prostak TM Bench Top Development System Lit No. DS200, 8/88.
"Toyo Soda Ultrafiltration Cassette UF-LABO" Undated.
Laboratory Ultrafiltration Products for Improved Biological Recovery Lit No. AB841, 10/88.
"Shorten the Race to the Market with Millipore Pilot and Process Systems." Lit No. SD100, 1/88.

Primary Examiner—David L. Lacey
Assistant Examiner—Thomas M. Lithgow
Attorney, Agent, or Firm—Steven J. Hultquist

[57] ABSTRACT

A filter plate which is longitudinally partitioned between its inlet and outlet ends, and features liquid feed and collection troughs at the respective ends which are of progressively decreasing depth from the medial part of the trough to the extremities thereof. Such plates may be associated in opposed, relatively inverted pairs to form enclosed flow channels characterized by fluid flow rates which are substantially uniform across the full transverse extent of the flow path and which facilitate the utilization of the full areal extent of the filter media employed therewith. Also described in a unitary filter element which may be usefully employed in the filter.

The filter of the invention may be highly efficiently employed for dewatering of aqueous biomass suspensions, desalting of proteins, removal of secreted metabolites from cellular suspensions, and the like.

6 Claims, 4 Drawing Sheets

FILTER PLATE, FILTER PLATE ELEMENT AND FILTER COMPRISING SAME

CROSS-REFERENCE TO RELATED APPLICATION

This is a division of U.S. application Ser. No. 07/104,177 filed Oct. 2, 1987 now U.S. Pat. No. 4,867,876.

BACKGROUND OF THE INVENTION

1. Field of The Invention

This invention relates generally to cross-flow filters comprising a multiplicity of stacked filter plates, of a type wherein filter elements are disposed between adjacently paired stacked plates.

2. Description of the Related Art

Stacked plate cross-flow filters are utilized in a variety of solids-liquid separation operations, including the dewatering of solids-liquid suspensions such as aqueous biomass suspensions, the desalting of proteins, and the removal of secreted metabolites from cellular cultures. In such systems, the stacked plates making up the cross-flow filter are typically mounted in a unitary frame structure whereby the respective plates are retained in alignment, in a so-called "plate and frame" construction. A unitary liquid feed conduit provided with openings at spaced intervals along its length and extending through the stacked plates is typically employed as a feed means from which influent solids-containing liquid is introduced into the flow channels defined between adjacent plates in the stacked plate assembly. The flow channels in the plate and frame filter contain filter elements, such as disposable filter paper sheets, with which the solids-containing liquid is contacted and through which solids-depleted liquid passes. A unitary liquid withdrawal conduit featuring openings at spaced intervals along its length extends through the stacked plates in liquid flow communication with the respective flow channels of the stacked plate assembly and conveys solids-depleted liquid out of the filter system.

As filtration proceeds, the filtered solids build up in the flow channels of the filter, on the "feed liquid sides", i.e., active filtration surfaces, of the filter sheets. The filter is then periodically backwashed, or alternatively, it may be fully shut down after a predetermined level of solids has accumulated in the flow channels on the filtration surfaces of the filter sheet elements, following which the system is drained of liquid, and the filter sheets replaced as necessary.

In one type of presently marketed stacked filter system, commercially available from Millipore Corporation (Bedford, Massachusetts) as the Prostak® cross-flow filter, the adjacent filter plates define a flow channel. Solids-containing influent liquid is fed at one side of the plate from a central location into a transversely extending feed distribution conduit, which is provided with openings at spaced apart intervals along the length of the conduit for egress of the solids-containing liquid. At the opposite side of the adjacent plates, the flow channel is similarly constructed with a liquid collection conduit having openings along its length to collect the solids-depleted liquid and discharge same from a central outlet communicating with the collection conduit.

A major problem which has been encountered in cross-flow filters of the above-described type is that the liquid flow distribution, as for example reflected by the volumetric liquid flow rate or liquid superficial velocity, is highly non-uniform in the transverse direction of the flow channel. Such maldistribution of the solids-containing liquid is a result of the fact that the influent liquid is introduced into the feed distribution conduit at a central location. Due to the pressure drop in the transverse direction, from the medial inlet port out to the extremities of the feed distribution conduit, the local longitudinal flow (cross-flow) of liquid from the inlet side to the outlet side of the stacked plates, at progressively farther transverse distances from the central liquid inlet port, is progressively reduced to an extent which is commensurate with the pressure drop experienced as the liquid is directed transversely to the outer extremities of the distribution conduit. As a result, there is preferential channeling of the liquid at the central part of the flow channel from the inlet side to the outlet side thereof, and concomitant under-utilization of the peripheral areas of the filter. When the solids in the central portion have been built up to a point requiring backwashing or draining of the filter, the peripheral areas of the filter still have available capacity to separate solids from the feed liquid.

Such transverse maldistribution of the feed liquid in cross-flow filters of the aforementioned type could conceivably be overcome by the provision of header manifolds to introduce feed liquid into the filtration channels at multiple introduction points along the sides of the stacked filter plates, with a corresponding outlet header manifold arrangement at the opposite side of the stacked plates. Unfortunately, however, such provision would significantly increase the overall system pressure drop as well as the complexity of the filter system, since it could be necessary to positively seal the multiplicity of feed liquid branch lines passing from the manifold into the filter.

Another type of stacked plate cross-flow filter which has been commercialized employs a transversely extending liquid distribution conduit with spaced apart openings therein to introduce solids-containing liquid into the flow channel between adjacent stacked plates, but instead of a central inlet port to flow the solids-containing liquid to such conduit, the liquid is axially fed into the conduit from a feed line connected to a transverse extremity of the conduit. Filters of such type are available from Millipore Corporation (Bedford, Mass.) under the trademark Pellicon ®. This feed arrangement results in a progressive diminution of the liquid pressure at increasing transverse distances from the feed end of the distribution conduit, which in turn results in progressively transversely decreased cross-flow rates of liquid in the flow channel.

In an effort to overcome the aforementioned liquid flow maldistribution characteristics of stacked plate filters, filter plates have been constructed with baffle elements defining discrete flow channels, with the intent of achieving a more uniform distribution of the solids-containing influent liquid across the full areal extent of the filter elements in the flow channels of the filter.

A filter plate commercially available from Toyo Soda Manufacturing Company, Ltd. (Tokyo, Japan) features a structure in which solids-containing influent liquid is introduced to the flow channel at a central inlet port at one side of the plate. A wall is disposed in front of the liquid inlet, extending upwardly from the floor of the flow channel and transversely toward the extremities of the flow channel, to divide the influent stream into two outwardly directed streams. Downstream from such stream-splitting wall is a longitudinally extending divider partition, the stream-splitting wall and the divider partition together forming a "T" construction when viewed in plan view. Longitudinally spaced from and parallel to the stream-splitting wall are a series of baffle partitions on either side of the divider partition. The baffles extend transversely part way across the flow channel on either side of the divider partition, so that there is formed a serpentine flow path for each of the split streams, on the respective sides of the partition. A unitary liquid outlet port is provided at the opposite side of the stacked plates from the inlet port, whereby the respective serpentine flows are finally joined and discharged from the flow channels of the filter.

Although the dual serpentine flow path arrangement described above provides a somewhat better distribution of liquid flow across the areal extent of the filter paper element, the sharp turns in the flow path at the extremities of the baffles create edge and entrance effects in the flow streams which produce substantial dead space and bypassing therein. As a result of such anomalous flow phenomena, the filtration efficiency of the baffled serpentine flow arrangement is significantly reduced.

Accordingly, it would be a substantial advance in the art to provide a filter plate characterized by substantially uniform transverse distribution of liquid from a unitary liquid feed port, and highly uniform liquid cross-flow across the full transverse extent of the flow channel formed when plates of such type are stacked to form a cross-flow filter.

It therefore is an object of the present invention to provide a filter plate of such type, which is simple and efficient in construction and operation.

It is another object of the invention to provide a cross-flow filter comprising stacked filter plates of such type.

Other objects and advantages of the invention will be more fully apparent from the ensuing disclosure and appended claims.

SUMMARY OF THE INVENTION

In a broad aspect, the present invention relates to a filter plate suitable for use with filter sheet elements to form a cross-flow filter. In the filter, pairs of such filter plates are mated with the filter sheet elements therebetween, to form flow channels wherein solids-containing liquid may be contacted with the filter sheet elements for filtration thereof to produce solids-depleted liquid.

The filter plate of the invention has a generally planar and rectangular shape with a substantially flat bottom surface. A top surface of the plate is provided with an upwardly extending wall circumscribingly bounding a flow channel of generally rectangular shape.

A liquid inlet port is disposed at a medial part of a first side of the flow channel, with a liquid outlet port at a medial part of a second side of the flow channel opposite the first side thereof.

The liquid inlet port is joined in liquid flow communication with a liquid feed trough extending transversely across the first side of the flow channel, and the liquid outlet port is joined in liquid flow communication with a liquid collection trough extending transversely across the second side of the flow channel.

A plurality of spaced-apart partitions extend upwardly from the floor of the flow channel between the liquid feed trough and the liquid collection trough, such partitions being of lesser height than the wall circumscribing the flow channel and substantially parallel to one another to define a series of sub-channels extending longitudinally between the liquid feed trough and the liquid collection trough.

The liquid feed trough in this plate is of progressively decreasing depth from its medial portion, in communication with the liquid inlet port, to its marginal extremities. The liquid collection trough is likewise of progressively decreasing depth from its medial portion, in communication with the liquid oulet, to its marginal extremities.

Plates of the foregoing type may be utilized in stacked pairs to form enclosed flow channels within which filtration may take place in a highly efficient manner. Specifically, a first plate of the type broadly described above is paired with a structurally identical second plate positioned in inverted relationship to the first plate such that the respective circumscribingly bounding walls of the first and second plates are in abutting sealing contact with one another. In such stacked arrangement, a foraminous support of generally rectangular shape approximating the dimensions of the flow channel is interposed between the adjacent plates, with filter sheet elements between the foraminous support and each of the paired filter plates.

In the operation of such a stacked filter plate assembly, liquid introduced via the liquid inlet port enters the liquid feed trough and is laterally distributed from the medial portion of the feed trough to its outer extremities. The progessively decreasing cross-section of the collection trough between the respective plates from the vicinity of the liquid inlet port to the extremities of the trough provides a liquid flow which is longitudinally directed into the sub-channels to provide a longitudinally directed liquid cross-flow which is highly uniform over the full transverse extent of the flow channel, so that the full areal extent of the sheet filter elements is highly effectively utilized. As a result, the solids filtration capacity of the stacked plate assembly is substantially increased and the assembly is capable of significantly extended operation prior to regeneration of the filter, as compared to the prior art cross-flow plate and frame filters illustratively described in the preceding section hereof.

In another aspect, the invention relates to a filter element which may be usefully employed with filter plates of the typed described above in stacked plate filter assemblies. The filter element comprises a support which includes a circumscribing frame with an array of spaced-apart and substantially parallelly aligned ribs extending between and joined at their opposite ends to the frame, so that the ribs and frame form a series of corresponding substantially parallel filter plate flow channels.

Openings are provided in the frame in liquid flow communication with the filtrate flow channels for egress of filtrate from the filtrate flow channels through the frame openings.

A first filter sheet is continuously secured along its margins to a first face of the frame, and a second filter sheet is correspondingly continuously secured along its margins to a second face of the frame. The first and second filter sheets together with the frame define an enclosed interior volume comprising the filtrate flow channels separated by the ribs.

In this manner, filtrate entering the enclosed liquid volume of the filter element through the first and second filter sheets is able to flow in the filtrate flow channels and be discharged from the filter element through the frame openings which are in liquid flow communication with the filtrate flow channels.

Other aspects and features of the invention will be more fully apparent from the ensuing disclosure and appended claims.

Figure 1:
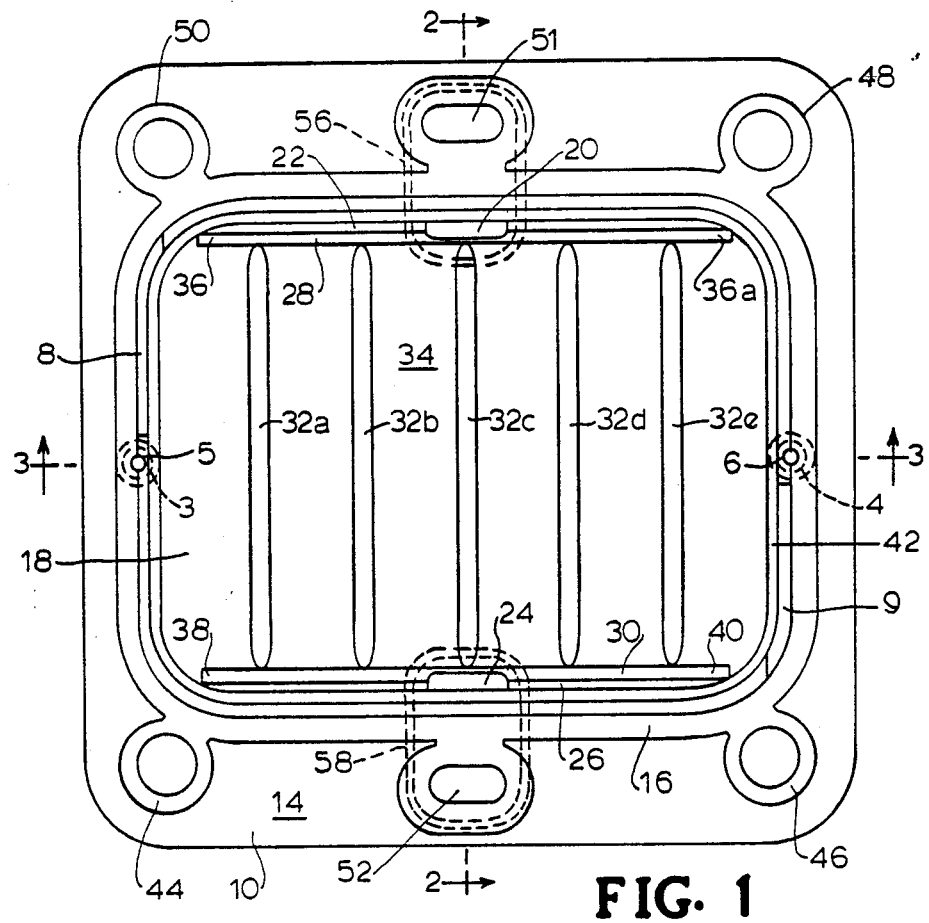
FIG. 1 is a top plan view of a filter plate according to the present invention.

Paragraph 3 is a sectional elevation view of the filter plate shown in FIG. 1, taken along line 3—3 thereof.

Figure 2:
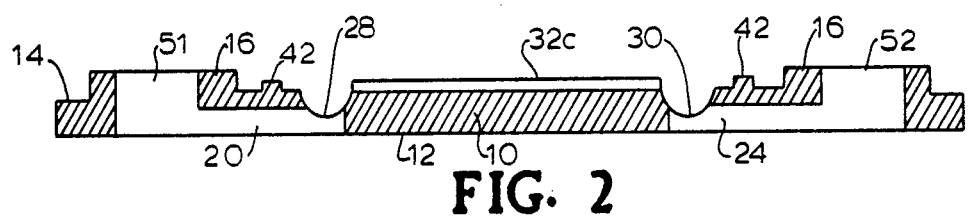
FIG. 2 is a sectional elevation view of the filter plate of FIG. 1, taken along line 2—2 thereof.
Figure 3:
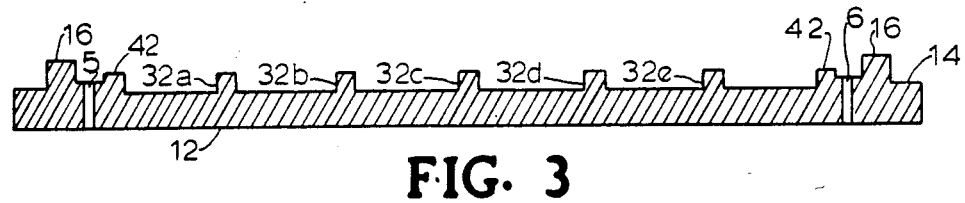
Figure 4:
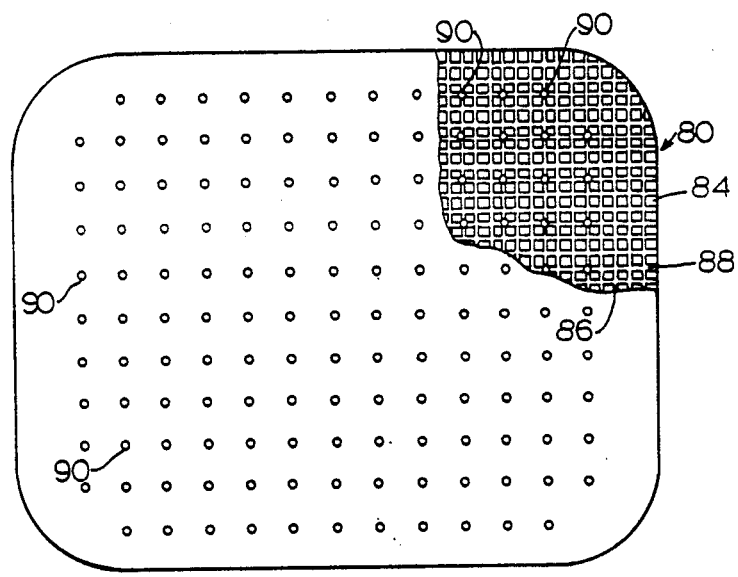

FIG. 4 is a top plan view of a foraminous support suitable for use with paired plates of the type shown in FIGS. 1-3, to form a stacked plate filter assembly.

Figure 5:
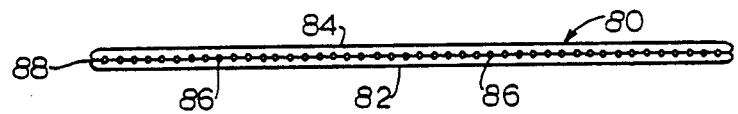

FIG. 5 is an edge elevation view of the foraminous support shown in FIG. 4.

Figure 6:
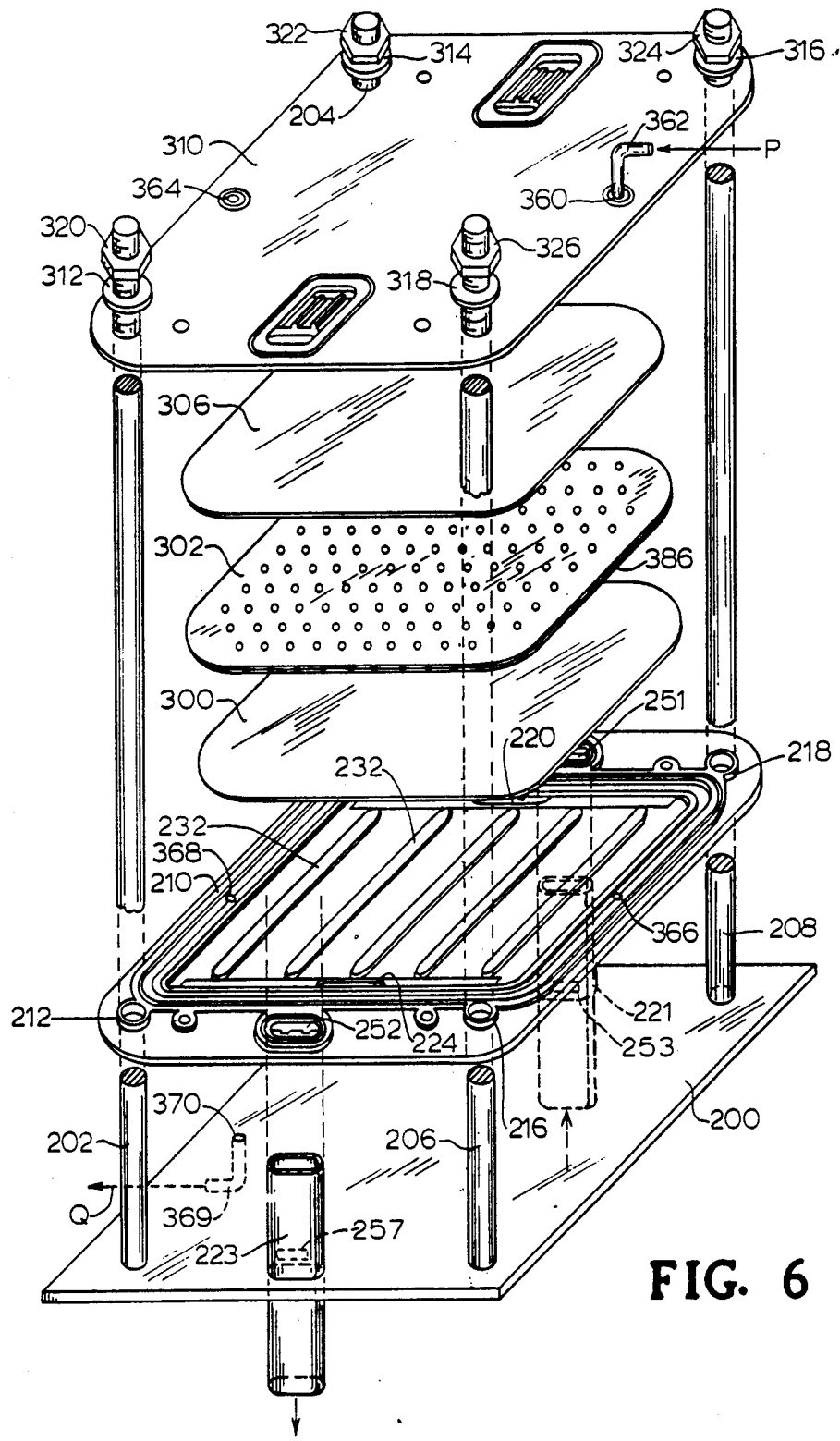

FIG. 6 is an exploded perspective view of a stacked plate filter assembly according to the present invention, showing the details of construction thereof.

Figure 7:
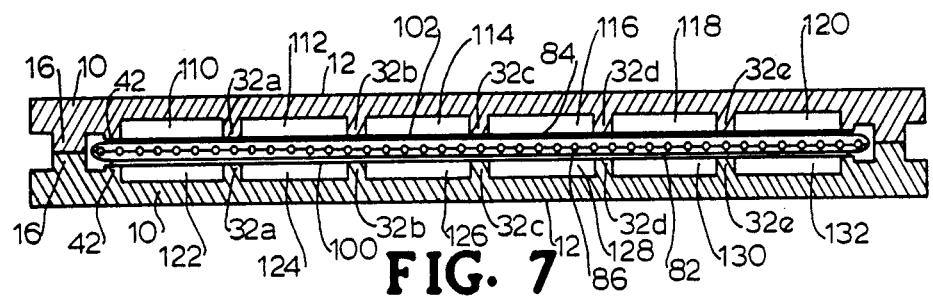

FIG. 7 is a transverse sectional elevation view of a stacked plate filter assembly according to the invention, showing the arrangement of the constituent parts thereof.

Figure 8:
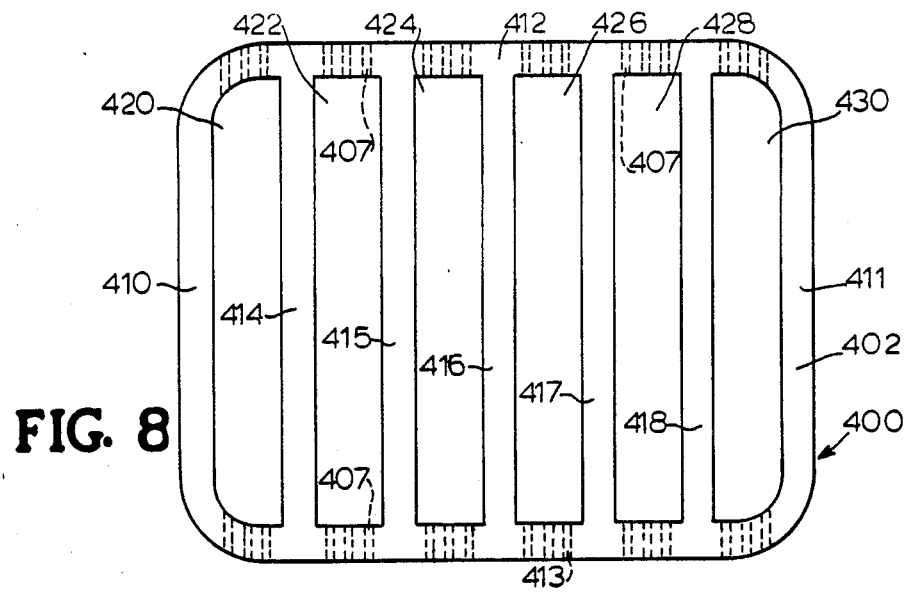

FIG. 8 is a plan view of a support for a unitary filter element assembly according to the invention.

Figure 9:

FIG. 9 is an edge elevation view of a unitary filter element assembly comprising the support shown in FIG. 8.

Figure 10:
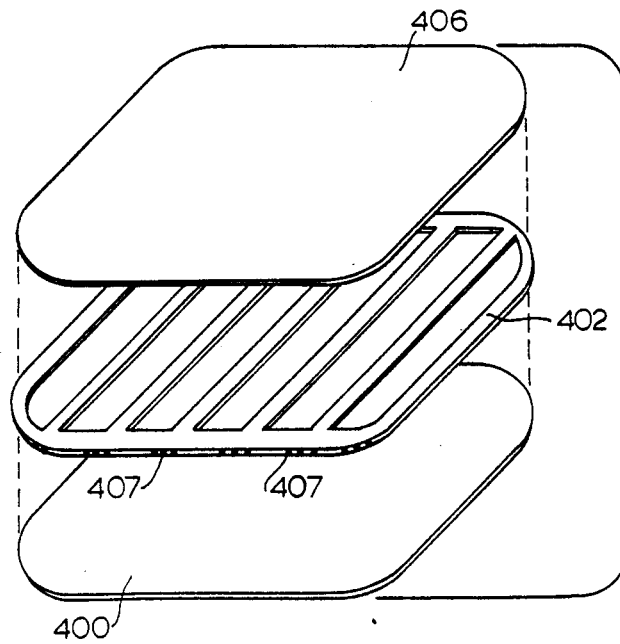

FIG. 10 is an exploded perspective view of the filter unitary filter element assembly shown in FIG. 9, illustrating the arrangement of its constituent parts.

DETAILED DESCRIPTION OF THE INVENTION, AND

PREFERRED EMBODIMENTS THEREOF

The filter plate of the present invention is adapted to be employed in multiple pairs to form a stacked plate filter assembly wherein adjacent paired plates are oriented invertedly with respect to one another, so that a single structured configuration may be employed for all of the plates in the stacked assembly.

The filter plates and the interposed foraminous support employed therewith may be formed of any suitable materials of construction, including plastics such as polypropylene, polyethylene, polysulfone, polyimides, etc.; ceramics; metals such as stainless steel; and polymeric fluorocarbons such as polytetrafluoroethylene.

Preferably, the plates and interposed foraminous support are made of materials which are adapted to accommodate high temperatures, so that the interior surfaces of the filter may be steam sterilized and/or chemically sanitized for regeneration and reuse.

FIG. 1 shows an illustrative filter plate according to the present invention, in plan view. FIG. 2 shows a sectional elevation view of the FIG. 1 plate, taken along line 2—2 thereof, and FIG. 3 is a sectional elevation view of the FIG. 1 plate, taken along 3—3 thereof.

Referring to these drawings, the plate member 10 is generally planar and may be rectangular in shape, having a generally square shape in the specific embodiment shown in FIG. 1. The plate has a substantially flat bottom surface 12 (see FIGS. 2 and 3), and a top surface 14 which is substantially flat in the peripheral portions of the plate. The top surface 14 has an upwardly extending wall 16 circumscribingly bounding a flow channel 18 of generally rectangular shape within the bounding wall.

A liquid inlet port 20 is provided at a medial part of a first side 22 of the flow channel. A liquid outlet port 24 is correspondingly provided at a medial part of a second side 26 of the flow channel opposite the first side thereof.

The liquid inlet port 20 is joined in liquid flow communication with a liquid feed trough 28 extending transversely across the first side of the flow channel. Correspondingly, the liquid outlet port 24 is joined in liquid flow communication with a liquid collection trough 30 extending transversely across the second side of the flow channel.

A plurality of spaced apart partitions 32a, 32b, 32c, 32d, and 32e, extend upwardly from the floor 34 of the flow channel between the liquid feed trough 28 and the liquid collection trough 30. The partitions 32a–32e are of lesser height than the wall 16 circumscribing the flow channel and are substantially parallel to each other, to define a series of sub-channels extending longitudinally between the liquid feed trough and the liquid collection trough.

The liquid feed trough 28 is of progressively decreasing depth from its medial portion, in communication with the liquid inlet port, to its marginal extremities 36 and 36a.

Likewise, the liquid collection trough 30 is of progressively decreasing depth from its medial portion, in communication with the liquid outlet port, to its marginal extremities 38 and 40. As used in this context, the term "depth" refers to the maximum vertical dimension of the feed or collection trough as measured from the bottom of the trough to the plane of the floor 34 of the flow channel 18.

Optionally, the plate may feature, as shown in FIG. 1, an interior circumscribing wall 42 of lesser height than the circumscribing main wall 16, to provide a bearing structure for retention of the foraminous support shown in FIGS. 4-5 and described more fully hereinafter.

The outer circumscribing wall 16 may as shown be formed with integral cylindrical flanges 44, 46, 48, and 50, each of which circumscribes a circular opening in the periphery of the plate to accommodate the positioning of the plate on spaced-apart rods, as hereinafter shown with reference to FIG. 6 hereof.

At the medial portions of the first and second sides of the plate, there are provided respective oblong openings 51 and 52 to accommodate the liquid feed and liquid withdrawal conduits which are employed to introduce liquid to and remove liquid from the flow channels defined by adjacently paired stacked plates. Such feed and discharge liquid conduits are more fully shown and described with reference to FIG. 6 herein. The respective liquid feed and discharge conduits are suitably formed with spaced-apart perforations therein which permit egress or ingress of liquid into or out of the flow channel via the above-described respective liquid inlet and outlet ports of the plate. In order to assure positive sealing of the flow channels and adjacently positioned plates relative to the liquid feed and discharge conduits, the liquid inlet and outlet ports of the plate are suitably provided with gasket elements 56 and 58 as shown in FIG. 1, at the bottom surface 12 of the plate.

As an example of plate dimensional characteristics for an illustrative embodiment of the invention, a filter plate suitable for filtration of aqueous biomass suspensions may be generally of square shape as shown in FIG. 1 with sides on the order of about 6 inches, and with feed and collection troughs 28 and 30 which are each 2 millimeters deep at their medial portions, continously decreasing to a depth of 1.5 millimeters at their respective extremities (peripheral portions 36 and 36a of feed trough 28, and peripheral portions 38 and 40 of collection trough 30). The transverse dimension (width) of each of the sub-channels defined by the partition walls 32a–e is approximately 2 centimeters.

The details of the plate construction are shown in FIG. 2 with respect to the structural features of the liquid inlet port 20 and liquid outlet port 24. All structural elements and features are numbered correspondingly in FIGS. 2 and 3 with respect to the same system elements of FIG. 1.

As previously described, the filter plate may be provided with a circumbscribing main wall 16 and an interior circumscribing wall 42 of lesser height than the main wall. Between these respective walls is formed a circumscribing channel (see FIGS. 2 and 3), into which suitable openings 5 and 6 may communicate as shown in FIGS. 1 and 3. These respective openings are usefully employed as filtrate (permeate) flow channels to convey or drain the solids-depleted filtered liquid or other permeate from the stacked plate assembly.

Openings 5 and 6 may also be usefully employed as gas flow openings to assist in draining the stacked plate filter upon cessation of normal operation for regeneration. Thus, when the filter is shut down, gas from a suitable supply source (not shown) may be introduced in openings 5 and/or 6 to pressurize the flow channel 18 to a sufficient extent where the same can be drained of accumulated biomass suspension upon the termination of normal liquid flows through the system.

Similarly, these respective openings could be employed for introduction and egress of steam for steam sterilization of the system or for flowing a chemical sterilant through the flow channel 18 prior to initiation or re-initiation of normal filtration operation.

Further, because the edges of the foraminous support are disposed in the channel between bounding walls 42 and 16, as shown in FIG. 7, described more fully hereinafter, it is also possible to utilize openings 5 and 6 as respective secondary fluid inlet and discharge passages, for flowing a secondary fluid through the foraminous support for mass transfer contacting of the liquid introduced into the flow channel 18 from inlet port 20 and discharged from the flow channel in outlet port 24. For such purpose, it may be advantageous to symmetrically "block" the channel between bounding walls 42 and 16, at symmetrically opposed regions, as shown in FIG. 1, where channel blocking segment 8 is disposed in the channel along the side thereof containing opening 5, and channel blocking segment 9 is similarly disposed in the channel proximate to opening 6. With such arrangement, fluid entering in opening 5 is diverted downwardly in the channel as shown in the drawing and across the lower portion of the channel as shown until it encounters the channel blocking element 9. Subsequently, when the fluid so introduced is issued from the edges of the foraminous support into the opposite portion of the channel as shown, it flows to outlet opeing 6.

Openings 5 and 6 may be appropriately sealed between adjacent plates by provision of suitable gasket means 3 and 5, respectively, at the flat bottom surface 12 of the plate, as shown in dotted line representation in FIG. 1.

FIGS. 4 and 5 show respective top plan and edge views of an illustrative foraminous support element for the stacked plate filter assembly. Corresponding features of the plate are shown by the same reference numerals in these two drawings.

The foraminous support 80 is simply a support element of generally rectangular shape which is supportively reposable at a first face 82 thereof on the partitions 32a–32e and the circumscribing wall 42 of the plate element, with a first filter sheet, e.g. a filter paper sheet, therebetween.

The foraminous support 80 is likewise supportively reposable at a second face 84 thereof on the partitions and inner bounding wall of a complementary filter plate paired with the filter plate against which the first face 82 of the support is reposed. The second face of the foraminous support likewise has a sheet filter element between its surface and the partitions of the adjacent plate member.

The foraminous support is formed with a plurality of longitudinally extending interior liquid flow channels 86 and a plurality of transversely extending interior liquid flow channels 88, wherein the longitudinal and transverse channels criss-cross one another to establish an extended interconnected network for liquid flow through the interior of the support element. Concurrently connecting the internal liquid flow network with the top and bottom foraminous support surfaces 84 and 82 on which sheets of filter paper or other filtration sheet members are mounted, is an array of surface openings 90. Thus, when a sheet of filter paper is provided for example on the top surface 84 of the foraminous support, the liquid (permeate) component of the solids-liquid suspension passes through the filter paper and openings 90 into the interior liquid flow network comprising channels 86 and 88, for flow through the foraminous support to the edge regions thereof, where the solids-depleted liquid filtrate issues from the support into the channel between bounding walls 16 and 42 and may be removed via openings 5 and 6.

FIG. 7 is a transverse sectional elevation view of a stacked plate filter assembly according to the invention, showing the arrangement of the constituent parts thereof, and numbered correspondingly to FIGS. 1–5 herein. As shown in FIG. 7, the identical complementary upper and lower plates are mated to one another. To insure positive sealing suitable gaskets (not shown) may be interposed (e.g., in opposing grooves) between the abutting top surfaces of the respective opposed bounding walls 16. A lower filter sheet 100 is disposed between the lower surface 82 of the foraminous support, and the partition bearing surface of the lower filter plate. Likewise, an upper filter sheet 102 is interposed between the top surface 84 of the foraminous support and the partition bearing surfaces of the upper filter plate.

By this arrangement, there is formed a series of sub-channels 110, 112, 114, 116, 118, and 120 between the filter sheet 102 and the upper filter plate, while correspondingly a series of sub-channels 122, 124, 126, 128, 130, and 132 are formed between the filter sheet 100 and the lower filter plate, with the sub-channels being longitudinally bounded by the respective partition walls 32a–32e, as shown.

Although the foraminous support has been shown as a structural element of mat-like form, the function of the support is merely to positionally retain the filter sheet on either side thereof and to accommodate the interior flow of solids-depleted liquid toward the filtrate (permeate) collection means associated with the filter plate.

Accordingly, in lieu of the specific foraminous support structure shown, there may be utilized for the support a conventional wire screen element, or a sintered metal plate, or any other construction which will provide the requisite supportive function for the filter sheets and accommodate flow therebetween toward the liquid permeate collection and discharge means. For example, the foraminous support may comprise a sintered ceramic material, e.g., of alumina, zirconia, etc., having an internal network of interconnected voids with an average void passage diameter on the order of about 1 micron. Such support may have a total void space on the order of from about 50 to about 90% by volume, e.g., about 80% voids. Further, it is to be recognized that such sintered ceramic plate may be glazed or otherwise treated on selected portions of its surface to render same liquid impermeable in such regions. Thus, the sintered ceramic plate could be selectively glazed to provide for flow through the interior thereof of a second fluid, e.g., a dialysis fluid for desalting of proteins, amino acids, and/or other biological substances being contacted with the filter sheets supported on such sintered plate.

FIG. 6 shows an exploded, perspective view of a stacked plate filter according to the present invention, as disposed on a base comprising a mounting plate 200 having vertically upwardly extending rods 202, 204, 206, and 208 at its respective corner portions, as shown. Mounted on the base as a lowermost element of the stack, is a filter plate 210 of the type shown in FIGS. 1-3. The respective rods 202, 206, and 208 extend through the circular openings in the plate which are surrounded by the respective cylindrical flanges 212, 216, and 218 (a similar flanged opening, not visible in this view, is provided for rod 204). The liquid feed conduit 221 for the filter extends through an opening in the base plate 200 and through the liquid inlet opening 251 of the plate member, so that when filter plate 210 is in position, the liquid feed opening 253 is in register with the liquid inlet opening 251 and liquid inlet port 220 of the filter plate.

In like manner, the liquid withdrawal conduit 223 extends through a corresponding opening in the base plate 200 and liquid outlet opening 252, whereby the liquid discharge opening 257 in conduit 223 is brought into register with liquid outlet port 224 when the bottom filter plate 210 is properly positioned.

Reposed on the upper bearing surfaces of the partition walls 232 of the bottom filter plate is a filter sheet 300. The filter sheet may be a paper filter sheet, comprising a non-woven web of cellulosic fibers, or any other replaceable or disposable filtration medium commonly provided in sheet form and which is readily cut or otherwise shaped to the form required in the filter of the present invention. A particularly advantageous filter sheet in filter systems of the type envisioned by the present invention are polysulfone filter sheets which are readily commercially available.

Overlying the filter sheet 300 is the foraminous support 302, which is of the form illustratively shown and described with reference to FIGS. 4-5 herein. Overlying the foraminous support 302 is filter sheet 306, which may be identical in shape and construction to filter sheet 300.

Overlying the upper filter sheet 306 is a filter plate 310 according to the present invention, of identical construction to lower plate 210 but positionally inverted with respect to the lower plate, to form interior sub-channels for liquid flow which are configured as shown in FIG. 7 when the stacked filter plate assembly of FIG. 6 is fully mated with respect to its constituent elements.

As shown, the upper filter plate 310 is configured with openings 364 and 360 communicating with the circumscribing channel (see FIGS. 2 and 3, showing the channel as disposed between bounding walls 42 and 16) sorrounding the main flow channel on the plate. Opening 364 in this configuration is closed by a suitable plug, while opening 360 has a fluid introduction passage 362 in flow communication therewith, for feeding of a second liquid, e.g., dialysate solution, into the circumscribing channel (the direction of liquid feeding being indicated by the arrow P). From the circumscribing channel, the liquid enters the foraminous support through the edge openings 386 thereof and flows therethrough to the opposite side of the lower filter plate and into thee circumscribing channel of the lower plate for discharge through openings 368 and 369 and out of the system through the fluid discharge passage 369 in the direction indicated by arrow Q. Circumscribing channel opening 366 of the lower filter plate is closed by a suitable plug in this arrangement.

The stacked filter plate assembly may be retained on the rods 202, 204, 206, and 208 by suitable mechanical fasteners, such as washers 312, 314, 316, and 318, and respective lock-nuts 320, 322, 324, and 326. For such purpose, the rods 202, 204, 206, and 208 are suitably configured with threaded outer surfaces.

It will be apparent from the foregoing that respective sections of stacked plates may be variously joined in fluid flow communication with one another in series to form stacked filter "trains" whose constituent sections may be employed to carry out a number of unit operations on an influent or feed material, such as concentrating (dewatering), washing, dialyzing, desalting, etc.

For example, a stacked filter train of series-connected sections may be employed in a cell culturing system of the type disclosed and claimed in my copending patent application U.S. application Ser. No. 06/936,486 filed Nov. 26, 1986, now U.S. Pat. No. 4,884,087, the disclosure of which is hereby incorporated by reference, in applications such as the production in vitro of human immunodeficiency virus (HIV) on cellular or synthetic microbead substrates. In such HIV production application, a first stacked plate section could be employed to concentrate HIV, a second section could be utilized to add media to withdraw media from the system, all without withdrawing any virus, such as might otherwise present a risk of immunosuppressive infection. Thus, a closed system virus culturing arrangement is provided, which is highly advantageous not only for the production of HIV but also the culturing or other processing of pathogenic bacterial, viral, and yeast species.

FIG. 8 is a plan view of a support for a unitary filter element. The support 400 includes a circumscribing frame 402 formed by the respective side portions 410, 411, 412, and 413. The circumscribing frame is associated with an array of spaced-apart and substantially parallelly aligned ribs 414, 415, 416, 417 and 418 extending between and joined at their opposite ends to the frame (sides 412 and 413, respectively). The ribs and frame thus corporately form a series of corresponding substantially parallel filtrate flow channels 420, 422, 424, 426, 428 and 430, as shown. Openings 407 are provided in the frame in liquid flow communication with the filtrate flow channels for egress of filtrate from the filtrate flow channels through the frame openings.

FIG. 9 is an edge elevational view of the filter element comprising the support shown in FIG. 8. FIG. 10 is an exploded perspective view of the unitary filter element whose edge elevational view is shown in FIG. 9.

As shown in FIGS. 9 and 10, the unitary filter element features a first filter sheet 406 which is continuously secured along its margins to a first face of the frame 402. Likewise, a second filter sheet 400 is continuously secured along its margins to a second face of the frame. When thus assembled, the first and second filter sheets together with the frame define an enclosed interior volume comprising the filtrate flow channels separated by the ribs. Accordingly, filtrate entering the enclosed liquid volume through the first and second filter sheets, i.e., by permeation of liquid through the filter sheets, may flow in the filtrate flow channels and be discharged from the filter elements through the frame openings 407 which are in liquid communication with the filtrate flow channels.

The above-described unitary filter element may suitably be constructed and employed for short term filtration operation, e.g., on the order of about 6 months, following which the filter element may be discarded and replaced with a corresponding new element.

The unitary filter element may be formed of any suitable materials, such as for example polysulfone, polyvinylidene fluoride, polypropylene, nitrocellulose, polyethylene, and the like, as may be useful in the desired end use filtration application. The first and second filter sheets may be continuously secured along their margins to the respective first and second faces of the frame by any suitable joining or attachment method, including, but not limited to, ultrasonic welding, heat sealing, solvent welding, and adhesive bonding, as well as mechanical affixation.

It will be apparent from the preceding description that any number of paired filter plates, with interposed support element and filter sheets, may be assembled to form a cross-flow filter. The number of stacked filter plates in a specific filter system will be largely determined by space requirements and constraints, allowable pressure drop in the system, solids concentration and volumetric flow rate of the liquid to be filtered, and the filtration efficiency of the specific filter sheets employed.

In an illustrative commercial embodiment having the dimensions for the filter plates previously described in connection with FIGS. 1-3 hereof, a superficial velocity of aqueous biomass suspension in the range of 1.5 meters per second through the flow channel defined between adjacent paired plates is readily accommodated, at a volumetric feed rate of approximately 1 liter of aqueous biomass suspension per minute in the flow channel, without any significant maldistribution of the liquid flow therein.

With the partitioned sub-channel structure of the flow channel between adjacent filter plates in the cross-flow filter of the invention, the influent liquid is distributed by the liquid feed trough so that substantially equal amounts of liquid are passed into each of the transversely spaced-apart sub-channels between adjacent plates. As a result of the decreasing depth of the liquid feed channel from its medial portion to its extremities, the pressure through the collection trough is equalized to the extent that the volumetric feedrate of liquid to be filtered is substantially equal in each of the sub-channels.

An analogous construction of the liquid collection trough at the opposite end of the flow channel provides a corresponding uniform collection of solids-depleted liquid after contacting of the solids-containing liquid with the filter sheet media.

The filter assembly comprising filter plates of the present invention is highly hydraulically uniform in operation, without the existence or operational tendencies toward flow anomalies, such as bypassing, channeling, and "dead space" formations, which are found in stacked plate filters of the prior art. Accordingly, the stacked plate filter assembly of the present invention achieves a substantial advance in the art, which permits the full areal extent of the filter sheet media to be efficiently employed for solids-liquid separation. In consequence, filter assemblies according to the invention are capable of extended operation relative to the on-stream operating periods characteristic of prior art filters, before regeneration or drainage and replacement of filter elements is necessary.

While the invention has been described with reference to specific illustrative embodiments, it will be apparent that there are other variations, modifications, and embodiments possible within the broad scope of the invention, and that all such variations, modifications, and embodiments are to be regarded as being within the spirit and scope of the invention as hereinafter claimed.

What is claimed is:

1. A filter plate having a generally planar and rectangular shape with a substantially flat bottom surface, and a top surface with an upwardly extending wall circumscribingly bounding a flow channel of generally rectangular shape with said top surface bounded by said upwardly extending wall comprising a top surface bounded by said upwardly extending wall comprising a floor of said flow channel, with a liquid inlet port at a medial part of a first side of said flow channel and a liquid outlet port at a medial part of a second side of said flow channel opposite said first side thereof, said liquid inlet port being joined in liquid flow communication with a liquid feed trough extending transversely across said first side of said flow channel, and said liquid outlet port being joined in liquid flow communication with a liquid collection trough extending transversely across said second side of said flow channel, with a plurality of spaced-apart partitions extending upwardly from the floor of said flow channel between said liquid feed trough and liquid collection trough, said partitions being of lesser height than said wall circumscribing said flow channel and substantially parallel to one another to define a series of sub-channels extending longitudinally between said liquid feed trough and said liquid collection trough, said liquid feed trough being of progressively decreasing depth from its medial portion, in communication with said liquid inlet port, to its marginal extremities, and said liquid collection trough being of progressively decreasing depth from its medial portion, in communication with said liquid outlet port, to its marginal extremities.

2. A filter plate according to claim 1, formed of a material of construction selected from the group consisting of polyethylene, polypropylene, polysulfone, polyvinylidenefluoride, poplytetrafluoroethylene, ceramics, polyimides, glass, and metal.

3. A filter plate according to claim 1, wherein said flow channel is circumscribingly bounded by a second upwardly extending wall interior to and of lesser height than the first circumscribingly bounding wall, forming a peripheral channel between the respective walls.

4. A filter plate according to claim 3, wherein the peripheral channel is arranged to collect filtrate liquid in use of the plate, with an opening in the peripheral channel for removing filtrate liquid therefrom.

5. A stacked-plate filter comprising a mated pair of filter plates and having disposed between said mated pair of filter plates a filter support element with main top and bottom faces having a filter sheet disposed on each said face, wherein each filter plate of said mated pair of filter plates comprises:

a filter plate having a generally planar and rectangular shape with a substantially flat bottom surface, and a top surface with an upwardly extending wall circumscribingly bounding a flow channel of generally rectangular shape with said top surface bounded by said upwardly extending wall comprising a floor of said flow channel, with a liquid inlet port at a medial part of a first side of said flow channel and a liquid outlet port at a medial part of a second side of said flow channel opposite said first side thereof, said liquid inlet port being joined in liquid flow communication with a liquid feed trough extending transversely across said first side of said flow channel, and said liquid outlet port being joined in liquid flow communication with a liquid collection trough extending transversely across said second side of said flow channel, with a plurality of spaced-apart partitions extending upwardly from the floor of said flow channel between said liquid feed trough and liquid collection trough, said partitions being of lesser height than said wall circumscribing said flow channel and substantially parallel to one another to define a series of sub-channels extending longitudinally between said liquid feed trough and said liquid collection trough, said liquid feed trough being of progressively decreasing depth from its medial portion, in communication with said liquid inlet port, to its marginal extremities, and said liquid collection trough being of progressively decreasing depth from its medial portion, in communication with said liquid outlet port, to its marginal extremities.

6. A stacked-plate filter, for use with a disposable sheet filter element, comprising:

(a) a first generally planar and rectangular filter plate having a substantially flat bottom surface, and a top surface with an upwardly extending wall circumscribingly bounding a flow channel of generally rectangular shape with said top surface interior to said upwardly extending wall comprising a floor of said flow channel, with a liquid inlet port at a medial part of a first side of said flow channel and a liquid outlet port at a medial part of a second side of said flow channel opposite said first side thereof, said liquid inlet port being joined in liquid flow communication with a liquid feed trough extending transversely across said first side of said flow channel, and said liquid outlet port being joined in liquid flow communication with a liquid collection trough extending transversely across said second side of said flow channel, with a plurality of spaced-apart partitions extending upwardly from the floor of said flow channel between said liquid feed trough and said liquid collection trough, said partitions being of lesser height than said wall circumscribing said flow channel and substantially parallel to each other to define a series of sub-channels extending longitudinally between said liquid feed trough and said liquid collection trough, said liquid feed trough being of progressively decreasing depth from its medial portion, in communication with said liquid inlet port, to its marginal extremities, and said liquid collection trough being of progressively decreasing depth from its medial portion, in communication with said liquid outlet port, to its marginal extremities;

(b) a foraminous support of generally rectangular shape supportively reposable at a first face thereof on said partitions of said first filter plate;

(c) a second filter plate structurally identical to said first plate member, positioned in inverted relationship to said first plate member such that said circumscribingly bounding walls of said first and second filter plates are in abutting contact with one another, with said foraminous support between said first and second filter plates and supported by the respective partitions thereof; and (d) filter sheets on either side of the foraminous support, interposed between the foraminous support and the supporting partitions of the respective first and second filter plates.

* * * * *

UNITED STATES PATENT AND TRADEMARK OFFICE
CERTIFICATE OF CORRECTION

PATENT NO. : 4,956,085

DATED : September 11, 1990

INVENTOR(S) : Henry B. Kopf

It is certified that error appears in the above-identified patent and that said Letters Patent is hereby corrected as shown below:

Title page line 1, after "ELEMENT" insert --,--.

Column 12, lines 41-42, after "comprising" delete --a top surface bounded by said upwardly extending wall comprising--.

Signed and Sealed this

Thirty-first Day of December, 1991

Attest:

HARRY F. MANBECK, JR.

Attesting Officer

Commissioner of Patents and Trademarks